US012312849B2

(12) United States Patent
Herper

(10) Patent No.: US 12,312,849 B2
(45) Date of Patent: May 27, 2025

(54) HINGE ASSEMBLY AND PIECE OF FURNITURE OR DOMESTIC APPLIANCE

(71) Applicant: GRASS GMBH, Reinheim (DE)

(72) Inventor: Markus Herper, Mühltal (DE)

(73) Assignee: Grass GmbH, Reinheim (DE)

( * ) Notice: Subject to any disclaimer, the term of this patent is extended or adjusted under 35 U.S.C. 154(b) by 0 days.

(21) Appl. No.: 18/889,475

(22) Filed: Sep. 19, 2024

(65) Prior Publication Data

US 2025/0012124 A1 Jan. 9, 2025

Related U.S. Application Data

(63) Continuation of application No. PCT/EP2023/055663, filed on Mar. 7, 2023.

(30) Foreign Application Priority Data

Mar. 21, 2022 (DE) .................... 10 2022 106 566.9

(51) Int. Cl.
*E05F 1/08* (2006.01)
*E05D 3/16* (2006.01)
*E05F 15/611* (2015.01)

(52) U.S. Cl.
CPC ............. *E05D 3/16* (2013.01); *E05F 15/611* (2015.01); *E05Y 2201/43* (2013.01); (Continued)

(58) Field of Classification Search
CPC .... E05D 3/06; E05D 3/14; E05D 3/18; E05D 3/183; E05D 3/186; E05F 15/611; (Continued)

(56) References Cited

U.S. PATENT DOCUMENTS 4,023,623 A * 5/1977 Anderson ............ A01B 73/044 74/105
10,214,950 B2 * 2/2019 Frank ........................ E05D 3/16
(Continued)

FOREIGN PATENT DOCUMENTS

AT 508 072 A1 10/2010
CN 110685524 A 1/2020
(Continued)

OTHER PUBLICATIONS

International Preliminary Examination Report (with Chapter II Claims) (Application No. PCT/EP2023/055663) dated Jun. 12, 2024 (with English translation) (25 pages).
(Continued)

*Primary Examiner* — Chuck Y Mah
(74) *Attorney, Agent, or Firm* — BURR PATENT LAW, PLLC

(57) ABSTRACT

A hinge assembly including a drive device and a hinge having a hinge arm for moving a pivoting element of an appliance or piece of furniture. The pivoting element is mounted movably on a body of the appliance or furniture by means of the hinge. One side of the hinge is attached to the body and another side of the hinge is attached to the pivoting element. The drive device has a drive motor unit with an end section coupled to the hinge arm. First and second flange components arrange the drive motor unit on the pivoting element. The drive motor unit is arranged on the pivoting element by the first and second flange components. The first and second flange components each have an attachment section for fastening the respective flange component and each have a coupling section for coupling the drive motor unit to the respective flange component.

13 Claims, 4 Drawing Sheets

(52) U.S. Cl.
CPC ....... *E05Y 2600/46* (2013.01); *E05Y 2600/52* (2013.01); *E05Y 2900/20* (2013.01)

(58) Field of Classification Search
CPC ............... E05F 15/614; E05Y 2201/43; E05Y 2201/434; E05Y 2201/456; E05Y 2600/46; E05Y 2600/52; E05Y 2600/522; E05Y 2600/528; E05Y 2600/53; E05Y 2600/56
See application file for complete search history.

(56) References Cited

U.S. PATENT DOCUMENTS

| | | | | |
|---|---|---|---|---|
| 2007/0186480 | A1 | 8/2007 | Freeman | |
| 2010/0109497 | A1* | 5/2010 | Blersch | E05F 1/1253 312/405 |
| 2013/0221825 | A1* | 8/2013 | Bonomie | E05F 3/227 16/303 |
| 2016/0195325 | A1* | 7/2016 | Kim | E05D 11/0054 312/405 |
| 2018/0245391 | A1* | 8/2018 | Margonari | F24C 15/023 |
| 2019/0368247 | A1* | 12/2019 | Carbone | E05D 11/00 |
| 2020/0256110 | A1* | 8/2020 | Meurer | E05F 3/22 |
| 2022/0034577 | A1* | 2/2022 | Oh | F25D 23/028 |
| 2022/0034578 | A1* | 2/2022 | Seo | F25D 23/028 |
| 2022/0178187 | A1* | 6/2022 | Gunn | E05D 3/14 |
| 2024/0060349 | A1* | 2/2024 | Ajari | E05F 15/53 |

FOREIGN PATENT DOCUMENTS

| | | | | |
|---|---|---|---|---|
| CN | 109386197 | B * | 12/2021 | E05D 15/40 |
| DE | 102018100674 | B4 * | 3/2020 | A47B 96/201 |
| DE | 102019216193 | A1 * | 4/2021 | E05D 7/00 |
| DE | 10 2020 112 492 | A1 | 8/2021 | |
| WO | 2010/105281 | A1 | 9/2010 | |

OTHER PUBLICATIONS

International Search Report and Written Opinion (Application No. PCT/EP2023/055663) dated Jun. 7, 2023 (11 pages).
German Search Report (Application No. 10 2022 106 566.9) dated Jan. 30, 2023 (10 pages).

* cited by examiner

HINGE ASSEMBLY AND PIECE OF FURNITURE OR DOMESTIC APPLIANCE

CROSS REFERENCE TO RELATED APPLICATIONS

This application is a continuation of International Application No. PCT/EP2023/055663 filed Mar. 7, 2023, which designated the United States, and claims the benefit under 35 USC § 119 (a)-(d) of German Application No. 10 2022 106 566.9 filed Mar. 21, 2022, the entireties of which are incorporated herein by reference.

FIELD OF THE INVENTION

The present invention relates to a hinge assembly and piece of furniture or domestic appliance.

BACKGROUND OF THE INVENTION

In the case of pieces of furniture and domestic appliances with pivoting elements mounted movably thereon, e.g. doors or flaps, different assemblies for attaching the pivoting element movably to a body of the piece of furniture or domestic appliance are known. In the state of use of the piece of furniture or domestic appliance, the pivoting element is movable relative to the body by means of the hinge assembly, e.g. about a pivoting axis oriented horizontally or vertically, in order to allow access to an interior space of the body and/or of the pivoting element and in order to separate the interior space from the outside in a closed state of the pivoting element on the body. The pivoting element is generally movable manually and/or by being driven, for example.

In the case of pieces of furniture and domestic appliances, e.g. cabinets or refrigerators or freezers, hinge assemblies that are of compact construction and are mechanically stable are matched to the specific use on the piece of furniture or domestic appliance. Thus, a proven hinge assembly designed as a standard item can be used in many and various applications. The hinge assembly is generally attached to the body and to the pivoting element. In the case of mass-produced products, such as refrigerators and freezers, there is a desire to design the piece of furniture or domestic appliance, on the one hand, and the hinge assembly, on the other hand, in an appropriately matched or prepared manner, thereby making standardization possible. This allows universal use of proven hinge assemblies for a large number of different pieces of furniture and domestic appliances, without changing their design, and this is advantageous in terms of economics and when assembling such pieces of furniture and domestic appliances.

For prior art, see CN 110685524 A, DE 10 2020 112 492 A1, US 2007/0186480 A1 and WO 2010/105281 A1.

SUMMARY OF THE INVENTION

It is the object of the present invention to further improve an initially mentioned hinge assembly and/or an associated piece of furniture or domestic appliance in terms of economic and technical aspects, in particular, to further develop it/them in respect of increased operating convenience for a user.

The present invention starts from a hinge assembly comprising a drive device and a hinge having a hinge arm, wherein the hinge is designed for moving a pivoting element of a domestic appliance or of a piece of furniture, wherein the pivoting element can be mounted movably on a body of the domestic appliance or piece of furniture by means of the hinge, wherein one side of the hinge is designed for attachment to the body and another side of the hinge is designed for attachment to the pivoting element, wherein the drive device has a drive motor unit, which is designed for arrangement on the pivoting element and wherein an end section of the drive motor unit is coupled to the hinge arm, such that the articulatedly mounted hinge arm of the hinge can be set in motion by the drive motor unit in such a way that a movement of the pivoting element relative to the body takes place in the mounted state of the hinge assembly. For example, the hinge assembly is a motor-operated hinge, e.g. an electric door opener or an electric hinge, e.g. for automatically movable refrigerator doors of refrigerators, freezer doors for freezers or the like. For example, the hinge assembly has a standard hinge which is designed to be mounted, via two end sections of the hinge, on a section of the body prepared for the hinge and on a section of the pivoting element prepared for the hinge. For example, the hinge comprises, for example, precisely one hinge arm, precisely two, precisely three or more than three hinge arms, which are present in an articulatedly movable manner on the hinge. For example, the plurality of articulation axes of the hinge arm or of the hinge arms are aligned parallel to one another. For example, the hinge is a multi-joint hinge, e.g. a four-, five- or six-joint hinge. For example, prepared sections are provided on end sections on both sides of the hinge, e.g. with a level contact surface for contact with the pivoting element, on the one hand, and on the body, on the other hand. The contact surface has at least one opening or one through hole, e.g. a through hole or a screw socket or a socket for a screw fastening means, by means of which the hinge, e.g. one side of the hinge, can be attached releasably but firmly, e.g. screwed, to the body, on the one hand, and to the pivoting element, on the other hand. In this case, a fastening mechanism, e.g. a screw fastening mechanism, reaches through the through hole and into a material region of the pivoting element or into the material of the body. For example, the one through hole or the plurality of through holes in the hinge is a through hole or are through holes which are already present in any case as standard, for example, in a known hinge for attachment to the piece of furniture or domestic appliance. For example, the through holes can be used additionally or exclusively for connection of the hinge to a flange component, e.g. by means of a screw fastening mechanism which, for example, reaches through the flange component and the contact surface and engages in material of the pivoting element and of the body and connects the respective sections to one another. For example, there is precisely one hinge assembly with the associated hinge and precisely one further hinge on a pivoting element, that is to say precisely two hinges. For example, the two hinges are of the same kind, e.g. identical, in terms of function and form. For example, the drive device is an electric motor or e-motor, e.g. a linear drive or, for example, a spindle drive. For example, the drive device is a linear drive with an actuating element, e.g. a pushrod, that can be moved backward and forward linearly. For example, the actuating element is implemented by means of a spindle that is driven in rotation or is moved linearly by such a spindle. By way of example, the actuating element is mechanically coupled, e.g. motion-coupled, to the hinge arm. For example, the actuating element is part of a lever assembly. The actuating element can be coupled to the hinge via a receptacle on the hinge arm, for example, which receptacle comprises an externally accessible screw contour or receiving contour on the hinge arm of the hinge, for example. The actuating element can be coupled to the hinge via a screw-on contour or plug-fastening contour that is externally accessible on the installed hinge, for example, the contour having a screw-in or plug-in opening in the hinge arm, for example. For example, the hinge is configured in such a way that it correctly performs the hinge function, comprising a pivoting movement of the pivoting element, without the drive motor unit. For example, the hinge is a standard hinge. For example, the hinge is designed without a drive device engaging on the hinge arm or some other drive device, such as a drive motor, thus enabling the pivoting element to be moved relative to the body when a pulling or pushing force is exerted externally on the pivoting element, e.g. by a person. The hinge enables pivoting of the pivoting element in two opposite pivoting directions relative to the body.

In the case of the hinge assembly with a drive device, for example, the pivoting element is moved out of a position in which it is up against the body, e.g. a closed position, away from the body, or opened, during the forward movement of the coupled actuating element, being driven by the drive device. In the case of a return movement of the actuating element coupled to the hinge arm of the hinge, the pivoting element is moved out of a position in which it has been moved or pivoted away from the body, e.g. an open position, toward the body, or closed, being subject to the driven movement imposed on the hinge arm. The drive device can be switched accordingly.

As an option, there is a coupling between the drive device and the hinge arm. For example, a speed-increasing or speed-reducing transmission or some other transmission, and/or a clutch, e.g. a slipping clutch and/or, for example, an overload clutch, is provided.

For example, the body-side end of the hinge engages by means of a body fastening arrangement of the hinge in the region, for example, of a body edge which is vertical in the state of use and is formed on the outside of the body between a bottom section on a front side of the body and a section on a side wall of the body, which side wall adjoins the front side. For example, the fastening arrangement has an element with legs, e.g. an angle element with angle legs that are at right angles to one another and are connected to one another, which element fits around the section on the front side by means of one leg and around the section of the side wall by means of another leg. For example, the fitting around the vertical body edge and the adjoining sections on the body takes place at the bottom on the front right-hand side or at the bottom on the front left-hand side of the body, depending on whether the pivoting element is attached to or articulated on the body on the right- or the left-hand side. Elements of the hinge extend from the leg on the front side in the direction of the pivoting element or the fastening element of the hinge that can be attached thereto.

At the heart of the present invention is that a first flange component and a second flange component are provided for arrangement of the drive motor unit on the pivoting element, wherein the drive motor unit can be arranged on the pivoting element by means of the first flange component and by means of the second flange component, wherein the first flange component and the second flange component each have an attachment section for fastening the respective flange component and each have a coupling section for coupling the drive motor unit to the respective flange component, wherein, in the state in which the flange components are arranged on the pivoting element, the coupling section of the first flange component and the coupling section of the second flange component are oriented toward one another, with the result that the two flange components are in symmetry, wherein the drive motor unit is present between the first flange component and the second flange component.

For example, the drive motor unit is in direct, e.g. immediate, contact with the coupling section of the first flange component. For example, the drive motor unit is in immediate contact with the coupling section of the second flange component. For example, the drive motor unit is in direct contact with the coupling section of the first flange component. For example, a section of the drive motor unit is in immediate physical contact with or so as to touch the coupling section of the first flange component.

As an alternative, for example, the drive motor unit is in indirect contact with the coupling section of the first flange component. For example, the drive motor unit is in indirect contact with the coupling section of the second flange component. For example, a section of the drive motor unit is in indirect contact with the coupling section of the first flange component.

For example, the hinge assembly comprises the hinge with, for example, precisely one articulatedly mounted hinge arm or with a plurality of articulatedly mounted hinge arms. The hinge is, for example, a multi-joint hinge or a four- or five-joint hinge. For example, the hinge assembly comprises the drive device and the flange components. For example, a pivoting element is mounted in an articulated manner on the body by means of a hinge provided in addition to the hinge assembly. For example, precisely one drive device is generally sufficient to move precisely one pivoting element. For example, the pivoting element is mounted pivotably on the body by means of precisely two joint bearing locations, each having one hinge.

For example, precisely two flange components are provided. For example, the two flange components are in a mirror-inverted configuration with respect to one another. For example, the two flange components are provided on outer sections of the drive motor unit, e.g. on longitudinal ends of the drive motor unit, e.g. on opposite longitudinal ends of the drive motor unit. The receptacle between the two flange components enables attachment of the drive motor unit to the pivoting element in an economically advantageous manner. In addition, mounting of the drive motor unit on the pivoting element is easily possible. For example, the flange components are designed to be mounted on the pivoting element, e.g. in the lower edge region on a flat inner side of a refrigerator door or in the region of a narrow horizontal underside of the refrigerator door. Because the two flange components are provided separately, they can be positioned without problems or individually, in a variable and adaptable manner on the pivoting element. For example, the flange components are adaptable, e.g. to a length of the drive motor unit. For example, both flange components can be attached to the pivoting element using the same type of fastening, e.g. by means of mutually corresponding screw fastening mechanisms or plug-fastening mechanisms, and therefore only precisely one type of fastening means is required. This likewise facilitates attachment. The symmetry of the flange components is relative to the hinge assembly. For example, the two separate flange components are not identical. For example, the two flange components are in a mirror-inverted configuration. For example, the flange components on the hinge assembly and thus in the mounted state on the pivoting element are in alignment with one another with their respective longitudinal axis, for example. For example, the longitudinal axes of the two flange components lie on a common spatial axis, thereby ensuring that the attachment of the hinge assembly to the pivoting element is accomplished in an advantageous manner. For example, the two flange components have a spacing which provides a region in which the drive motor unit is present so as to fit. For example, the drive motor unit and the flange components are matched in such a way that the drive motor unit can be connected releasably to the two flange components. Preferably, opposite sections of the drive motor unit can be connected to the respective coupling section of the flange components. For example, end sections of the drive motor unit can be connected to the respective coupling section of the flange components. A respective section of the drive motor unit can be connected by, for example, latching, plugging and/or clamping to the respective coupling section of the flange components. For example, the respective coupling section has an elastically deflectable coupling section which can be connected to a matching counter-section. For example, the respective coupling section has an elastically deflectable coupling section which can be latched releasably to a latching section, e.g. a rigid latching section, matching the coupling section, on the respective end section of the drive motor unit. For example, the latching is fixed but capable of being canceled from outside, e.g. by manual intervention, e.g. by applying a release force to the coupling section. For example, the drive motor unit is mounted releasably on the two flange components. For example, the drive motor unit is mounted releasably on the two flange components in a manner that allows clamping or latching, for example. This is the case, for example, in the attached state of use of the hinge assembly on the piece of furniture or domestic appliance.

During the mounting of the hinge assembly, the drive motor unit can first of all be separated from the remainder of the hinge assembly, facilitating mounting. Without the drive motor unit mounted thereon, it is easier to transport, select and mount the two flange components on the pivoting element, for example. All that has to be taken into account during mounting is, for example, the alignment, e.g. the coinciding alignment, of the longitudinal axes with a common spatial axis, and the spacing between the two flange components on the pivoting element.

For example, precisely one flange component of the two flange components, the flange component which faces away from the side of the hinge on the pivoting-element side, can be attached to the pivoting element without contact with the hinge, with a corresponding spacing with respect to the pivoting arm. The drive motor unit is then present in the region of the spacing in the fully assembled state. For example, the other flange component is mounted on the hinge, e.g. on a fastening element of the hinge. For example, the fastening element is used to fasten the associated side of the hinge to the pivoting element. For example, the other flange component, which represents a flange component close to the hinge arm, for example, can additionally be attached directly to the pivoting element, for example. For example, connecting mechanisms, e.g. screw-fastening mechanisms, are provided, by means of which the common or simultaneous connection of the other flange component to the pivoting element and also to the fastening element of the hinge is established.

For example, both flange components are designed as an additional component, e.g. as an additional adapter, in relation to a complete hinge operating without a drive device, e.g. a conventional hinge, or to an automatic hinge, and can be additionally attached thereto. For example, the hinge assembly according to the present invention can be designed on the basis of such a known hinge or automatic hinge which does not comprise a drive device or drive motor unit. For example, a known hinge can be retrofitted with a drive motor unit. Retrofitting in the case, for example, of a refrigerator with a conventional hinge is therefore simple. For example, a known hinge for a refrigerator door that can be moved without a motor drive can be easily retrofitted, thus enabling the refrigerator door with the retrofitted hinge to be moved automatically or electrically.

For example, a known automatic hinge can be retrofitted with a drive device or drive motor without modifying the automatic hinge.

For example, the flange components are offset linearly with respect to one another or spaced apart along a line in a respectively identical alignment, for example, in the state of use of the hinge assembly on the pivoting element. For example, both respective longitudinal axes of the flange components coincide or are parallel and offset with respect to one another, e.g. being offset within a width or, for example, half a width of the drive motor unit. For example, the drive motor unit is mounted between the separate flange components. In the state in which they are arranged on the pivoting element, the two coupling sections or respective coupling sections are oriented toward one another, e.g. being in alignment with one another. For example, the longitudinal axis of the drive motor unit is, for example, transverse, e.g. at right angles or oblique, to a pivoting axis of the hinge or transverse to a pivoting axis of the hinge arm.

For example, each flange component in the basic form is configured as an element, e.g. an angular element, with, for example, two or three or more than three flat sections aligned at an angle to one another. For example, one section forms the attachment section, for example, and another section forms the coupling section, for example. For example, the coupling section is formed by precisely one section or by precisely two or more than two sections that are at an angle to one another.

The flange component is configured as an angle element, for example. The flange component is formed from sheet metal and/or plastic, for example.

For example, in the state in which the drive motor unit is arranged on the pivoting element, the coupling section of the first flange component and the coupling section of the second flange component are oriented toward one another, with the result that the two flange components are in mirror symmetry. For example, there is a mirror plane relative to the coupling section of the first flange component and the coupling section of the second flange component. For example, the respective narrow sides of the attachment section and of the coupling section, for example, face one another or are oriented toward one another. This facilitates easy mounting of the hinge assembly with the drive device on the pivoting element. For example, an associated mirror plane is situated in the center of a spacing between the two flange components in the longitudinal direction of the flange components or in the longitudinal direction of the drive motor unit. The mirror plane is transverse to the longitudinal direction of the drive motor unit, for example. For example, the two flange components are configured so as to be in mirror symmetry with one another in their shape.

For example, the coupling section of the first flange component and the coupling section of the second flange component are of identical configuration. This simplifies assembly. For example, it is possible to implement identical design of the locations, e.g. both locations, on the drive motor unit, e.g. at opposite longitudinal ends, on which the coupling section engages in each case. For example, the coupling section is a thin and/or flat and/or level section. For example, a straight front edge with flanks adjoining at right angles on both sides is formed on the coupling section.

For example, the coupling section is connected to the drive motor unit via two mutually spaced connecting or bearing points of the coupling section. A multi-point fastening, e.g. a two-point fastening, is thereby established, for example. The connection via the coupling section is established releasably, for example, e.g. by plugging on. The two bearing points allow variable connection to the drive motor unit. For example, one bearing location on the coupling section of the flange component is configured in such a way that some other type of fastening is possible between the flange component and the drive motor unit. For example, a screw-on connection is possible, e.g. in the form of a screw-on connection to the other bearing location.

For example, the other flange component is connected in an appropriate manner, via the coupling section, to the associated side of the drive motor unit, being plugged on for example.

For example, the attachment section of the first flange component and the attachment section of the second flange component are of identical configuration. This allows a unitary type of attachment, e.g. on the pivoting element. For example, a connection to one side of the hinge is made via the attachment section in the case of the flange component concerned. For example, the connection to one side of the hinge is made by means of a fastening element, e.g. by means of a fastening element of the hinge.

For example, the first flange component engages on a first end section of the drive motor unit, and the second flange component engages on a second end section of the drive motor unit, wherein the first flange component and the second flange component are spaced apart. Stable mounting is thereby provided. For example, two-point mounting or two-point fastening of the drive motor unit is provided. For example, the second end section of the drive motor unit can be attached to the pivoting element via the second flange component. For example, the first end section of the drive motor unit can be attached via the first flange component to a region of the pivoting element which is at a distance from the hinge. For example, the attachment of the drive motor unit to the associated side of the hinge is established by way of the first flange component, e.g. additionally. For example, the first flange component is set up for fastening the side of the hinge on the pivoting-element side to the pivoting element.

For example, the attachment section and the coupling section are oriented at an angle to one another. For example, the flange component is a bent sheet-metal element. For example, the attachment section and the coupling section are each plate-shaped. The angularity has a mechanically stabilizing effect and allows stable attachment of the drive motor unit to the pivoting element and/or to the associated side of the hinge. In the attached state on the pivoting element, e.g. an inner side of a refrigerator door, the coupling section, for example, extends perpendicularly, for example, to the plane of the inner side of the pivoting element. For example, in the attached state on the pivoting element, e.g. on an inner side of a refrigerator door, a flat and/or level side of the attachment section extends parallel to the plane of the inner side of the pivoting element.

For example, the attachment section and the coupling section are oriented at an angle, e.g. at right angles, to one another. For example, one surface side of the attachment section and one surface side of the coupling section are connected to one another via an edge section, such as a bending edge. For example, the edge section runs in alignment with the longitudinal axis of the drive motor unit, e.g. aligned parallel to the longitudinal axis of the drive motor unit.

For example, the attachment section is designed for connection to a fastening element, wherein the fastening element is used for attaching the other side of the hinge to the pivoting element. The relevant flange component can thereby be connected to the hinge in a sufficiently firm and fitting way to the hinge, enabling the exact and stable position of the drive motor unit relative to the remaining part of the hinge assembly. For example, the attachment section is formed integrally on the hinge.

For example, the attachment section has a flat section, e.g. a base of the attachment section. For example, the flat section of the attachment section is adapted to fit under an underside of the fastening element. For example, the flat section is sandwiched between other flat regions. For example, the flat section is situated between one side of the pivoting element and one side of the fastening element. For example, the flange component can be connected, on the one hand, to the pivoting element and, on the other hand, to the fastening element. For example, the associated side of the hinge is connected to the pivoting element. For example, the fastening element is a component of a conventional hinge which is designed for fastening the hinge on the pivoting element.

For example, the attachment section has a base for flat support on the pivoting element, and a web section formed above the base, wherein the web section is spaced apart from the base by a material-free region. As a result, connection of the flange component to the pivoting element, on the one hand, and to the counter section, on the other hand, is possible in a manner which allows a variable set up and is stable. For example, the base is used for attaching the flange component to the pivoting element. For example, the base is used for screwing the flange component to a side, e.g. an inner side, of the pivoting element. For example, the base rests by means of an underside of the base on, for example, the inner side of the pivoting element. For example, the fastening element is supported on the upper side of the base. For example, an underside of a fastening element is supported on the upper side of the base. For example, the underside is present on the hinge in order to attach the associated side of the hinge to the pivoting element. For example, the web section is used for additional fixing or attachment to the hinge and/or to sections of the drive motor unit. For example, the base and/or the web section each have a through hole for the passage of a screw connecting means. By means of the through hole, the flange component can be attached, e.g. screwed, to a counter section. For example, the flange component can be attached, e.g. screwed, to a flange component on a section of the drive motor unit. For example, the flange component can be attached, e.g. screwed, to the other flange component on the hinge. For example, the flange component can be attached, e.g. screwed, to a part of the hinge which engages on the pivoting element.

For example, the web section is a sheet-metal section, e.g. a strip-shaped sheet-metal section. The sheet-metal section is present in a freely projecting manner above the base, for example. For example, a free end of the web section is oriented counter to a free end of the coupling section. For example, the free ends in respective longitudinal directions are oriented toward one and the other longitudinal side, e.g. are present on the flange component in such a way as to be directed outward in a common direction. For example, both opposite longitudinal ends of the flange component serve for connecting the flange component to other sections, e.g. to sections of the drive motor unit. In the case of the hinge-side flange component, for example, a section of the drive motor unit is releasably fastened to one end of the coupling section. For example, some other component engages on the free end of the web section, e.g. one side of the hinge engages on the free end of the web section. On the flange component facing away from the hinge, for example, not only the coupling section but also the web section is used for connection to other sections. In addition to the coupling section, for example, the use is also made of the web section for additional fastening to or with the drive motor unit, and this increases the stability of connection.

For example, the planes of the base, on the one hand, and of the web section, on the other hand, or the surface of the base and the surface of the web section, are aligned with one another, e.g. aligned parallel to one another.

For example, the drive motor unit is mounted releasably on the first flange component and/or on the second flange component by means of a connection that can be established without tools. This facilitates the mounting and removal of the drive motor unit between the two flange components.

For example, the drive motor unit is attached in an identical manner to the first flange component and to the second flange component or to both flange components, e.g. plugged on in an identical manner or attached releasably in some other identical manner. For example, the attachment is established by a plug connection, clamping connection and/or latching connection. The type of connection is, for example, a positive releasable connection. Some other type of connection, e.g. a fixed connection, is possible as an alternative.

For example, the first flange component and/or the second flange component provide/provides a stop for the attached drive motor unit in a longitudinal direction of the drive motor unit. Additionally or alternatively, the first flange component and/or the second flange component provide/provides a stop in a direction transverse to the longitudinal direction of the drive motor unit. For example, a fixed attachment position of the drive motor unit on the pivoting element is established. In another or third direction, which is perpendicular to the two abovementioned directions of the longitudinal direction and transverse to the longitudinal direction or, for example, normal to the surface side of the pivoting element, the drive motor unit is supported on the flange component. The drive motor unit is supported on one side of the flange component, for example. The drive motor unit is supported on an upper side of the base of the flange component, for example. For example, the drive motor unit is mounted in a firmly fixed manner on the piece of furniture or domestic appliance in the state of use.

For example, the drive motor unit engages on the hinge arm of the hinge via a lever assembly. For example, coupling between the drive motor unit and the hinge arm is established by means of the lever assembly. For example, mechanical coupling is established between the drive motor unit and the hinge arm, with motion coupling of a part of the drive motor unit that can be moved by being driven and the hinge arm. For example, the movable part of the drive motor unit is the push element, which has motion coupling with the hinge arm. For example, the lever assembly engages on a hinge location that is readily accessible from the outside in the mounted state of the hinge assembly. For example, the hinge location that is readily accessible from the outside comprises the receptacle on the hinge arm of the hinge. For example, the location of engagement or receptacle on the hinge arm is present as standard or formed in advance. For example, this serves optionally to provide an additional function on a known hinge, e.g. a damper function with a damper or for some other additional component. For example, the location of engagement on a known hinge is used for releasable docking of a damper for motion damping on the hinge for a damped movement of the pivoting element relative to the body.

For example, the single-part or multi-partly assembly engages, on the one hand, on a linearly movable push element of the drive motor unit, e.g. a pushrod. For example, the lever assembly engages, on the one hand, on the hinge arm, directly or indirectly. For example, the lever assembly comprises a component that can be mounted separately on the hinge, e.g. an attachment element or adapter element, which consists of a plastic material, for example.

For example, the lever assembly is configured in such a way that, when the drive device is activated, the pivoting element moves relative to the body, being driven in an opening direction or in a closing direction, this being accomplished by virtue of the kinematics defined by the hinge. For example, the lever assembly is configured in such a way that in the case of a linear forward movement of the push element, e.g. a pushrod, moved by the drive motor unit, the hinge arm performs a pivoting motion about a hinge arm axis. For example, the motion of the hinge arm leads, via further hinge arms of the hinge, to a pivoting motion of the pivoting element relative to the body or leads to an opening movement of the pivoting element in an opening direction or in a closing direction counter to the opening direction. By means of the lever assembly, a torque is transmitted to the rotatably mounted lever arm of the hinge about the rotation or pivoting axis thereof.

For example, the lever assembly comprises a control lever, which is connected in articulated manner to an attachment element of the lever assembly, wherein the attachment element engages releasably on a receptacle on the hinge arm of the hinge. For example, the attachment element is a plug-fit element, which can be plugged, e.g. plugged and latched, onto a receptacle designed as a plug receptacle. For example, a multi-point or two-point attachment location of the control lever of the drive motor unit on the hinge arm is established by means of the attachment element of the lever assembly. Space-saving and reliable coupling of the drive motor unit and the hinge arm of the hinge is thereby achieved.

For example, the control lever is connected to the push element. For example, the control lever is connected to a pushrod of the drive motor unit. For example, the location on the hinge arm comprises a prepared contour which can be used or serves for coupling the lever assembly to the hinge arm. For example, the contour comprises two spaced insertion openings in an upper side of the hinge arm. For example, the location on the hinge arm, e.g. the prepared contour, comprises two differently configured insertion openings in an upper side of the hinge arm. For example, the location on the hinge arm, e.g. the contour, comprises a round opening and a slotted hole.

For example, the reception for coupling a section, e.g. a receiving element of the lever assembly on the hinge or on the hinge arm, takes place on a hinge receptacle already present as standard on the hinge. For example, the hinge receptacle already present as standard comprises an opening which serves as a plug-fit section and/or as a screw socket and, for example, is known as a "Zamak socket".

For example, the control lever has a bent shape, e.g. for articulated connection of the control lever to the attachment element. For example, the control lever has two opposite spaced bearing locations, e.g. for articulated connection of the control lever to the attachment element. For example, the control lever has a bent shape and comprises two opposite spaced bearing locations. For example, the bent shape relates to a side view. The control lever runs in a straight line in plan view and in the longitudinal direction of the drive motor unit, for example. For example, a vertical offset is bridged by the bent shape of the control lever. For example, a vertical offset when viewed normal to the base of the flange component and/or, in the mounted state, to an inner side of the pivoting element is bridged. For example, the vertical offset relates to different heights between a central longitudinal axis of the push element and the location on the hinge arm at which the lever assembly or attachment element engages.

The present invention furthermore extends to a piece of furniture or domestic appliance having a body and a pivoting element mounted movably on the body, wherein a hinge assembly according to one of the embodiments described above is provided for moving the pivoting element.

It is thereby possible to achieve the discussed features and advantages in the case of a piece of furniture or domestic appliance, e.g. a refrigerator. Since it should be optionally possible to attach the pivoting element on the left or right at the front of the body, a dual flange-component set designed in an appropriate manner for this purpose or a left-hand set with two associated flange components and a right-hand set with two associated flange components for optional attachment of the door on a right-hand or left-hand side of the body is to be provided.

BRIEF DESCRIPTION OF THE DRAWINGS

Further features and advantages are explained in greater detail with reference to the exemplary embodiments illustrated in the figures.

DETAILED DESCRIPTION OF THE INVENTION

Figure 1:
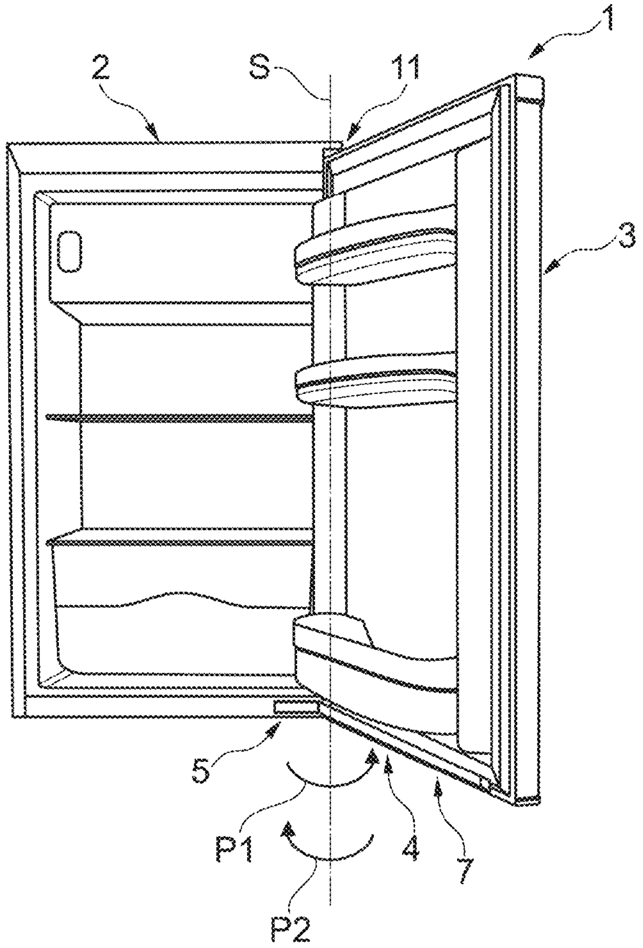
FIG. 1 shows a schematically illustrated domestic appliance in perspective view from the front with a pivoting element, mounted movably thereon by means of a hinge assembly, in an opened position relative to a body of the domestic appliance.
Figure 2:
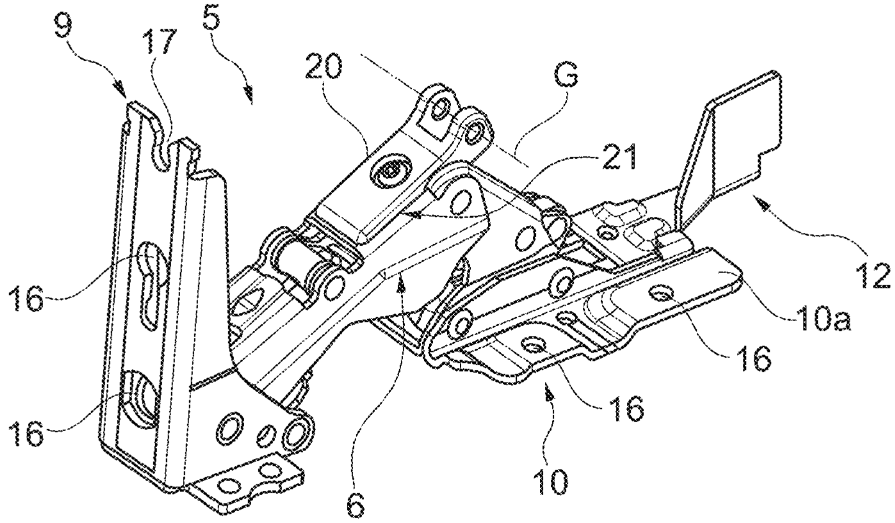
FIG. 2 shows a partially opened hinge of the hinge assembly shown in FIG. 1 with an attachment element in a perspective view.

FIG. 1 shows schematically a domestic appliance 1, by way of example a refrigerator, having a body 2 and a pivoting element 3, which is mounted movably on the body 2 and, in the exemplary embodiment, forms a refrigerator door of the refrigerator.

To move the pivoting element 3 in an opening direction P1 of the pivoting element 3 and in a closing direction P2 of the pivoting element 3 relative to the body 2, a hinge assembly 4 having a hinge 5 is provided at the bottom of the domestic appliance 1, on the right-hand side from the front. Accordingly, the pivoting element 3 is attached on the right to the refrigerator. A hinge 11 corresponding to hinge 5 acts between the body 2 and the pivoting element 3 at the top right-hand side of the domestic appliance 1. Each of the hinges 5, 11 is, for example, a hinge that can be obtained in standard form, e.g. a multi-joint hinge such as an automatic hinge, e.g. a wide-angle hinge with a plurality of hinge arms supported in an articulated manner.

The two hinges 5, 11 form a movement mounting or pivot mounting for the pivoting element 3 on the body 2. The two hinges 5, 11 are each provided between the body 2 and the pivoting element 3 in such a way that, in the set-up state of the domestic appliance 1, the two hinges 5, 11 form a common perpendicular or vertical pivoting axis S about which the pivoting element 3 can be pivoted backward and forward in directions P1 and P2 relative to the body 2.

Figure 3:
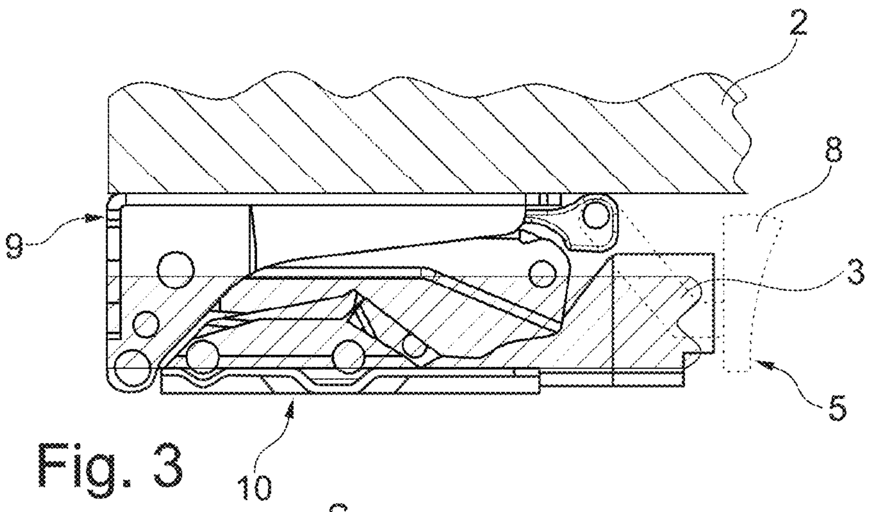
FIG. 3 shows the assembly shown in FIG. 2 with a drive device thereon, a section of which is shown and which is indicated by dashed lines, from the side in a first fully pivoted position in the state in which the assembly is mounted on a domestic appliance, which is illustrated in part and with one section concealed.

The pivoting element 3 can be pivoted or opened by different amounts relative to the body 2 in direction P1 from a closed position on the body 2, as indicated by FIG. 3, at a pivoting angle of 0 angular degrees between a front vertical surface side of the body 2 and a vertical inner or outer surface side of the pivoting element 3. The additional figures, FIGS. 4 to 7, show the hinge 5 in its different opened positions as it opens successively further, without the body 2 and without the pivoting element 3.

Figure 4:
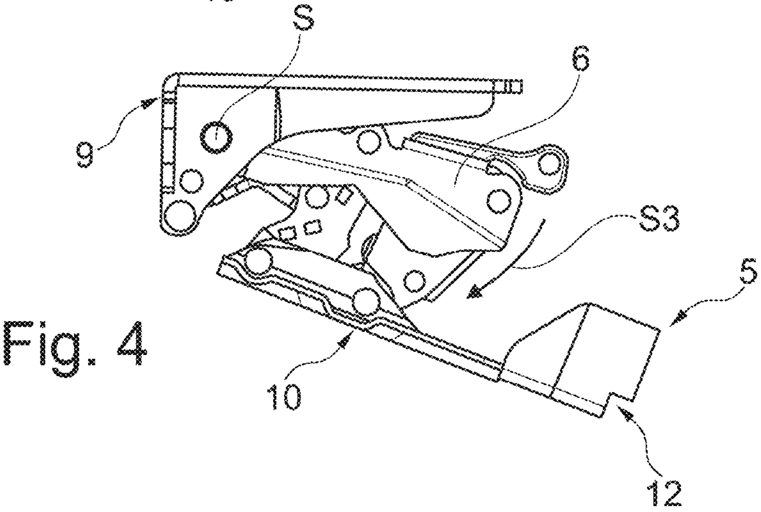
FIG. 4 to FIG. 7 show the assembly shown in FIG. 2 without parts of the domestic appliance and of the drive device from the side in different pivoted positions.

Accordingly, FIG. 4 shows a position of the hinge 5 associated with a corresponding pivoting position of the pivoting element 3, or a partially opened position of the hinge 5, in which, starting from the closed state in the zero angular degree position as per FIG. 3, the pivoting element 3 would be partially opened or pivoted by 20 angular degrees in direction P1 relative to the body 2 or the vertical front side thereof.

Figure 5:
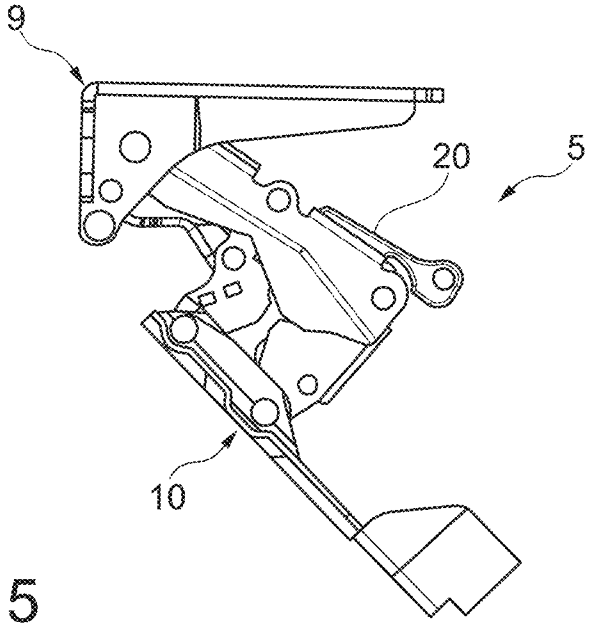

Accordingly, FIG. 5 shows a position of the hinge 5 or a partially opened position of the hinge 5 in which, starting from the closed state as per FIG. 3, the pivoting element 3 would be partially opened or pivoted by 45 angular degrees relative to the body 2 or the vertical front side thereof.

Figure 6:
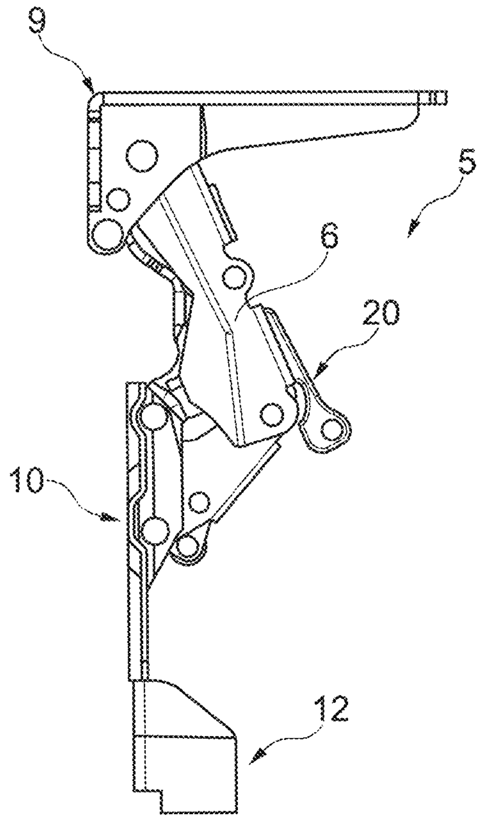

Accordingly, FIG. 6 shows a position of the hinge 5 or a partially opened position of the hinge 5, in which, starting from the closed state as per FIG. 3, the pivoting element 3 would be partially opened or pivoted by 90 angular degrees relative to the body 2 or the vertical front side thereof.

Figure 7:
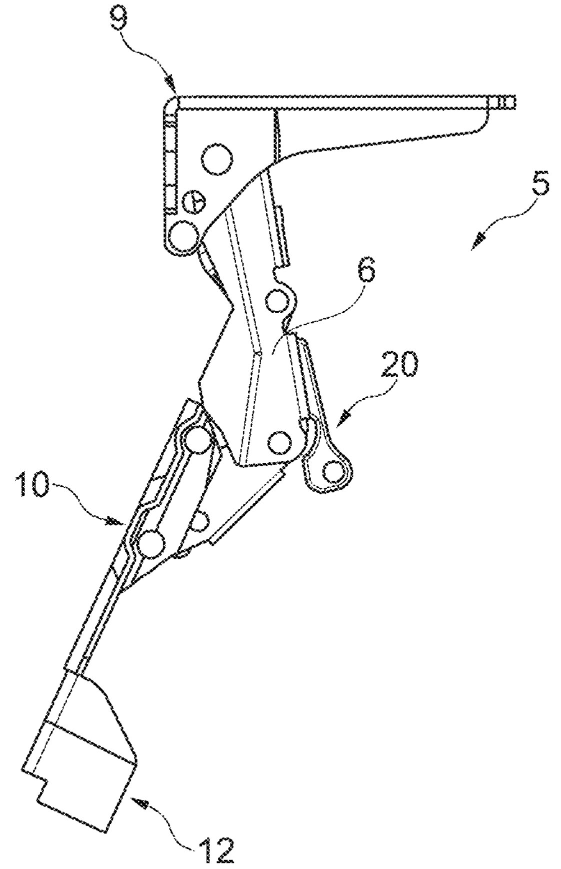

Finally, FIG. 7 shows a position of the hinge 5 or a partially opened position of the hinge 5, in which, starting from the closed state as per FIG. 3, the pivoting element 3 would be fully opened by 115 angular degrees or pivoted to the maximum extent relative to the body 2 or the vertical front side thereof.

The hinge assembly 4 comprises the hinge 5, which comprises a hinge arm 6 and additional hinge arms (not designated specifically), a drive device 7 and flange components 12, 13.

The flange component 12 shown in FIGS. 2-7 is configured in an alternative way to the flange component 12 shown in FIGS. 8-11.

The hinge 5, like the upper hinge 11, forms the mechanical base unit for moving the pivoting element 3 of the domestic appliance 1. All the articulation axes of the hinge arms are aligned parallel to one another, as in the case of standard hinges. One of these articulation axes coincides with the pivoting axis S (see FIG. 4).

The pivoting element 3 is mounted movably on the body 2 via the hinge 5. One side 9 of the hinge 5 is designed for attachment to the body 2, and another side 10 of the hinge 5 is designed for attachment to the pivoting element 3. The drive device 7 (see FIG. 8) has a drive motor unit 8, which is designed for arrangement on the pivoting element 3. The drive device 7 is configured as an electric drive device.

Figure 8:
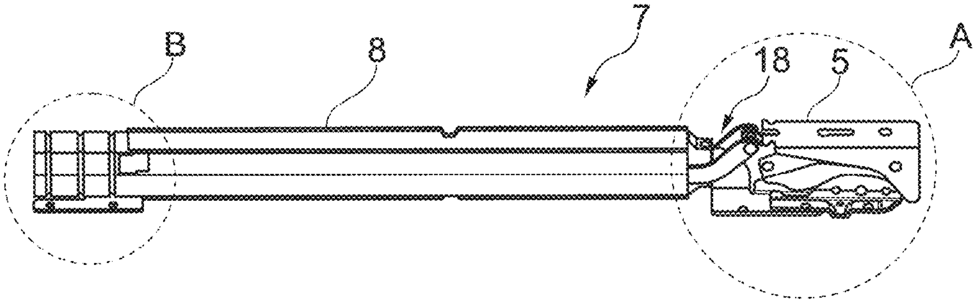
FIG. 8 shows a detail of the hinge assembly shown in FIG. 1 with a drive motor unit, with two flange components, and a detail of one side of the hinge.
Figure 9:
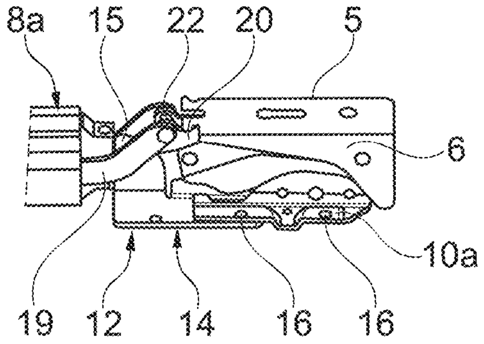
FIG. 9 shows the detail A in FIG. 8 on an enlarged scale.
Figure 10:
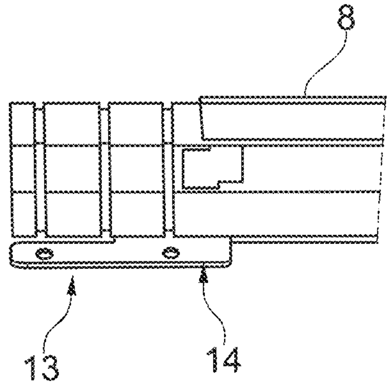
FIG. 10 shows the detail B in FIG. 8 on an enlarged scale.

An end section 8*a* of the drive motor unit 8 when considered in the longitudinal direction is coupled to the hinge arm 6, this being shown in more detail in FIGS. 8 and 9. In an energized driving mode of the drive device 7, the drive device 7 is supplied with power via a connection (not shown) to a power supply arrangement, e.g. being supplied internally in the drive device 7 by means of an energy storage device such as a battery and/or from outside by means of an electric cable supply. By means of the activated and energized drive motor unit 8, the articulatedly mounted hinge arm 6 can be set in a pivoting motion S3 about a hinge-arm pivoting axis during the opening process of the pivoting element 3 (see FIG. 4), wherein the hinge-arm pivoting axis coincides with the pivoting axis S of the pivoting element (see FIG. 4). In the mounted state of the hinge assembly 4 and the hinge 11 on the domestic appliance 1, there is thus a movement of the pivoting element 3 relative to the body 2 in direction P1 or, when the hinge arm 6 is pivoted in the opposite direction to direction S3, in the closing direction P2.

Accordingly, the hinge assembly 4 is configured as a motor-driven hinge, e.g. as an electric door opener, such as a refrigerator door opener.

The two flange components 12, 13, which are separate for example, are provided for the arrangement of the drive motor unit 8 on the pivoting element 3. The flange components 12, 13 are components additional to or separate from the hinge 5, for example. Alternatively, the hinge-side flange component 12 could also be formed integrally with the side 10 of the hinge 5. The drive motor unit 8 can be arranged on the pivoting element 3 by means of the flange components 12, 13. The drive motor unit 8 is mounted between the two flange components 12, 13 at each of the ends, in opposite end sections of the drive motor unit 8. The attachment and removal of the drive motor unit 8 to and from the two flange components 12, 13 is advantageously performed manually by means of a simple assembly action, e.g. by a fitter.

The two flange components 12 and 13 each have an attachment section 14 for fastening the flange component 12, 13 on the pivoting element 3 and a coupling section 15 for coupling the drive motor unit 8 to the flange component 12, 13. The attachment section 14 and the coupling section 15 are each flat, level sections, e.g. sheet-metal sections, if the flange component 12, 13 consists of a sheet-metal material. The attachment section 14 and the coupling section 15 are, for example, at an angle to one another, e.g. at right angles. The attachment section 14 and the coupling section 15 are connected integrally to one another in the region of a bending edge, for example.

In the state of the flange components 12, 13 in which they are arranged on the pivoting element 3, the two coupling sections 15 are oriented toward one another. In this case, the respective narrow sides of the attachment section 14 and of the coupling section 15 face one another or are oriented toward one another, for example. The two flange components 12 and 13 are in symmetry. An associated mirror plane E is indicated in FIG. 11.

Figure 11:
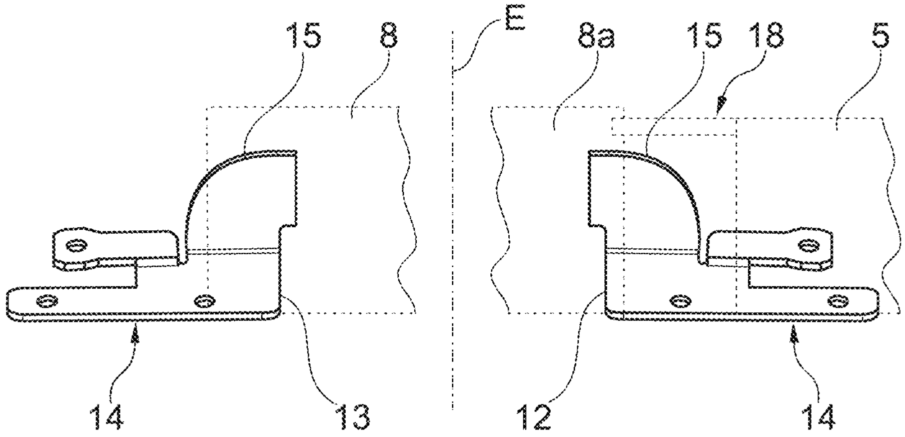
FIG. 11 shows the two flange components shown in FIG. 8, wherein, in contrast to FIG. 8, the drive motor unit, which is shown with an interruption and in sections, and the detail of the side of the hinge are indicated only in dashed lines.

As is illustrated, in particular, by FIGS. 8 and 11, the two coupling sections 15 or the narrow end faces of said sections on the flange components 12, 13 attached to the pivoting element 3 are oriented toward one another in the state of the drive motor unit 8 in which it is arranged on the pivoting element 3. The two flange components are thus in mirror symmetry with respect to the mirror plane E.

The sides 9 and 10 of the hinge 5 each have openings 16, e.g. screw openings for the engagement or passage of fastening means, such as screws, and/or recesses 17 for fastening the hinge 5 on the domestic appliance 1. The openings 16 and recesses 17 are present as standard on standard hinges, for example, and can likewise be used in the case of the hinge assembly 4, e.g. in interaction with receptacles for the fastening means, which are likewise present in advance as standard on the domestic appliance 1 or the body 2 and the pivoting element 3. For this purpose, the side 10 of the hinge 5 has a fastening element 10*a*, which is flat, for example, and/or plate-like, for example, with, for example, precisely two spaced openings 16. By means of the recess 17 and/or the openings 16, the flange component 12 can furthermore be connected to the side 10 of the hinge 5, for example.

The drive motor unit 8 engages via a lever assembly 18 on the hinge arm 6 of the hinge 5. By means of the lever assembly 18, coupling is established between the drive motor unit 8 and the hinge arm 6. The coupling is a mechanical coupling and comprises a motion coupling, e.g. a kinematic coupling, of elements of the drive motor unit 8, on the one hand, and of the hinge 5, on the other hand. The movement of a part that can be moved by being driven, such as a pushrod (concealed in the figures or in FIG. 9) of the drive motor unit 8, which can be moved backward and forward linearly, brings about motion coupling with the hinge arm 6, which can thereby be pivoted about a hinge axis of the hinge 5 or about the pivoting axis S. Thus, depending on the driving direction of the push rod, the hinge arms are unfolded or folded, and the pivoting element 3 is thereby pivoted relative to the body 2 in the respective direction P1 or P2.

The lever assembly 18 has a control lever 19, which is connected to a linear element of the drive motor unit 8, e.g. to a pushrod. The control lever 19 is connected in an articulated manner to an attachment element 20, e.g. a plug-fit element of the lever assembly 18. The attachment element 20 engages releasably, being screwed or latched, for example, on a receptacle 21 on the hinge arm 6 of the hinge 5. The receptacle 21 is present as standard on the hinge, e.g. being readily accessible from outside, as a plug-fit and/or screw-fit receptacle, and can be used for the attachment of the drive motor unit 8 via the lever assembly 18.

The control lever 19 has a bent shape and, in the hinge-side end section, comprises two opposite spaced bearing locations for articulated connection to the attachment element 20. The control lever 19 is connected in a manner articulated about a joint axis G (see FIG. 2) to the attachment element 20, which is attached in a fixed position to the hinge arm 6. For this purpose, there are, for example, aligned round openings, two in the attachment element 20 and two in the control lever 19, through which a joint element, e.g. a joint pin 22, passes and is axially secured.

LIST OF REFERENCE SIGNS

1 domestic appliance
2 body
3 pivoting element 4 hinge assembly
5 hinge
6 hinge arm
7 drive device
8 drive motor unit
8*a* end section
9 side
10 side
10*a* fastening element
11 hinge
12 flange component
13 flange component
14 attachment section
15 coupling section
16 opening
17 recess
18 lever assembly
19 control lever
20 attachment element
21 receptacle
22 joint pin

The invention claimed is:

1. A hinge assembly comprising a drive device and a hinge having a hinge arm, wherein the hinge is designed for moving a pivoting element of a domestic appliance or of a piece of furniture, wherein the pivoting element can be mounted movably on a body of the domestic appliance or piece of furniture by means of the hinge, wherein one side of the hinge is designed for attachment to the body and another side of the hinge is designed for attachment to the pivoting element, wherein the drive device has a drive motor unit, which is designed for arrangement on the pivoting element and wherein an end section of the drive motor unit is coupled to the hinge arm, such that the articulatedly mounted hinge arm of the hinge can be set in motion by the drive motor unit in such a way that a movement of the pivoting element relative to the body takes place in the mounted state of the hinge assembly, wherein a first flange component and a second flange component, which are separate, are provided for arrangement of the drive motor unit on the pivoting element, wherein the drive motor unit can be arranged on the pivoting element by means of the first flange component and by means of the second flange component, wherein the first flange component and the second flange component each have an attachment section for fastening the respective flange component and each have a coupling section for coupling the drive motor unit to the respective flange component, wherein, in the state in which the flange components are arranged on the pivoting element, the coupling section of the first flange component and the coupling section of the second flange component are oriented toward one another, with the result that the two flange components are in symmetry, wherein the drive motor unit is present between the first flange component and the second flange component, wherein the drive motor unit is fastened releasably on the first flange component and/or on the second flange component by means of a connection that can be established without tools.

2. The hinge assembly as claimed in claim 1, wherein, in the state in which the drive motor unit is arranged on the pivoting element, the coupling section of the first flange component and the coupling section of the second flange component are oriented toward one another, with the result that the two flange components are in mirror symmetry.

3. The hinge assembly as claimed in claim 1, wherein the coupling section of the first flange component and the coupling section of the second flange component are of identical configuration.

4. The hinge assembly as claimed in claim 1, wherein the attachment section of the first flange component and the attachment section of the second flange component are of identical configuration.

5. The hinge assembly as claimed in claim 1, wherein the first flange component engages on a first end section of the drive motor unit, and in that the second flange component engages on a second end section of the drive motor unit, wherein the first flange component and the second flange component are spaced apart.

6. The hinge assembly as claimed in claim 1, wherein the attachment section and the coupling section are oriented at an angle to one another.

7. The hinge assembly as claimed in claim 1, wherein the attachment section is designed for connection to a fastening element, wherein the fastening element is used for attaching the other side of the hinge to the pivoting element.

8. The hinge assembly as claimed in claim 1, wherein the attachment section has a base for flat support on the pivoting element, and a web section formed above the base, wherein the web section is spaced apart from the base by a material-free region.

9. The hinge assembly as claimed in claim 1, wherein the first flange component and/or the second flange component provide/provides a stop for the attached drive motor unit in a longitudinal direction of the drive motor unit, and/or provide/provides a stop in a direction transverse to the longitudinal direction of the drive motor unit.

10. The hinge assembly as claimed in claim 1, wherein the drive motor unit engages on the hinge arm of the hinge via a lever assembly.

11. The hinge assembly as claimed in claim 10, wherein the lever assembly comprises a control lever, which is connected in articulated manner to an attachment element of the lever assembly, wherein the attachment element engages releasably on a receptacle on the hinge arm of the hinge.

12. The hinge assembly as claimed in claim 11, wherein the control lever has a bent shape and comprises two opposite spaced bearing locations for articulated connection of the control lever to the attachment element.

13. A piece of furniture or domestic appliance having a body and a pivoting element mounted movably on the body, wherein a hinge assembly as claimed in claim 1 is provided for moving the pivoting element.

* * * * *